US010423903B2

(12) United States Patent
Yeager

(10) Patent No.: US 10,423,903 B2
(45) Date of Patent: Sep. 24, 2019

(54) METHODS, SYSTEMS, AND COMPUTER-READABLE MEDIA FOR HORIZONTAL WELL DEVELOPMENT PLANNING AND OTHER RESOURCE CONSTRAINED OPERATIONAL PLANNING

(75) Inventor: Justin Yeager, Conroe, TX (US)

(73) Assignee: ATLAS PLANNING SOLUTIONS LLC, Magnolia, TX (US)

( * ) Notice: Subject to any disclaimer, the term of this patent is extended or adjusted under 35 U.S.C. 154(b) by 821 days.

(21) Appl. No.: 13/552,464

(22) Filed: Jul. 18, 2012

(65) Prior Publication Data
US 2014/0025413 A1    Jan. 23, 2014

(51) Int. Cl.
G06Q 10/10 (2012.01)
G06Q 10/06 (2012.01)

(52) U.S. Cl.
CPC .............. *G06Q 10/0631* (2013.01)

(58) Field of Classification Search
CPC .............. G06Q 10/10; G06Q 10/06
USPC .......................... 705/7, 8, 9, 7.12
See application file for complete search history.

(56) References Cited

U.S. PATENT DOCUMENTS

| | | | |
|---|---|---|---|
| 8,004,930 B2 | 8/2011 | Welker et al. | |
| 8,214,243 B2 * | 7/2012 | Graham et al. | 705/7.22 |
| 2004/0220846 A1 * | 11/2004 | Cullick | G06Q 10/06 |
| | | | 705/7.22 |
| 2004/0255266 A1 | 12/2004 | Dement | |
| 2007/0299643 A1 | 12/2007 | Guyaguler et al. | |
| 2008/0087427 A1 * | 4/2008 | Kaminsky | E21B 41/0064 |
| | | | 166/272.1 |
| 2009/0024442 A1 * | 1/2009 | Brink et al. | 705/9 |
| 2009/0090555 A1 * | 4/2009 | Boone | E21B 44/02 |
| | | | 175/45 |
| 2009/0125367 A1 * | 5/2009 | Brink et al. | 705/9 |
| 2009/0210277 A1 | 8/2009 | Hardin et al. | |
| 2009/0254407 A1 * | 10/2009 | Fagan et al. | 705/9 |

(Continued)

OTHER PUBLICATIONS

Oracle Corporation, "Plan and Execute the Right Projects—Easily and Affordably. Primarvera Enterprise Project Portfolio Management", 12 pages, 2010.

*Primary Examiner* — Nga B Nguyen
(74) *Attorney, Agent, or Firm* — Jeffrey L. Wendt; The Wendt Firm, P.C.

(57) ABSTRACT

Methods and systems for identifying potential simultaneous operational conflicts among a plurality of assets in a project. One method includes storing operational scheduling data for a project having one or more project assets, the project assets able to perform a plurality of operational activities at defined coordinates, in a scheduling database, and storing project-specific variables for the project in an external data source. A database query is then performed of the scheduling database and the external data source using a computer, returning all possible combinations of the operational activities, including defining a common reference, calculating distances from each defined coordinate to each other defined coordinate, and filtering the calculated distances to filter out potential operational conflicts, for example distances greater than one or more user-defined buffer distances. Potential simultaneous operational conflicts may be displayed in tabular or graphical form on a user interface electronically connected to the computer.

9 Claims, 11 Drawing Sheets

(56) References Cited

U.S. PATENT DOCUMENTS

| | | | |
|---|---|---|---|
| 2010/0100409 A1* | 4/2010 | Rahi | G06Q 10/06 705/7.12 |
| 2010/0114493 A1* | 5/2010 | Vestal | E21B 44/00 702/9 |
| 2010/0257004 A1 | 10/2010 | Perlmutter et al. | |
| 2011/0087662 A1 | 4/2011 | Darby, Jr. et al. | |
| 2011/0288895 A1 | 11/2011 | Perez, Jr. et al. | |

* cited by examiner

METHODS, SYSTEMS, AND COMPUTER-READABLE MEDIA FOR HORIZONTAL WELL DEVELOPMENT PLANNING AND OTHER RESOURCE CONSTRAINED OPERATIONAL PLANNING

CROSS-REFERENCE TO RELATED APPLICATIONS

None

BACKGROUND INFORMATION

Technical Field

The present disclosure relates generally to the field of resource constrained operational planning methods and systems, with horizontal well development planning serving as a non-limiting example.

Background Art

"Critical path method" is a well-established planning and scheduling method. Planning/scheduling tools, such as the software known under the trade designation PRIMAVERA", and similar planning/scheduling tools use a critical path method ("CPM") engine to calculate total and free float for a project, defined by the Project Management Institute as: "a temporary endeavor with defined scope . . . ". In typical project planning, the scope of the deliverable (project) is known and understood upfront. This allows the CPM engine to perform a forward and backward pass. The forward pass calculates the earliest an activity can start or finish based on its predecessors. The backward pass starts from the end of the project and works backward to calculate the latest an activity can start and finish (without impacting the calculated end date for the project—deterministic). The path of 0 float is the critical path, to which a day of delay on an activity results in a day delay to the project. Resource analysis is also typically approached with a different intention. For instance, during resource analysis, any activities that are delayed due to resource un-availability could potentially have more resources allocated to compress the schedule.

No current tools address the unique operational challenges of horizontal oil & gas well developments, referred to herein as simply "horizontal well developments", which typically, but not necessarily are in shales. With each horizontal well development comprising multiple "stages", each horizontal well is effectively 10-20 "normal" vertical wells. The volumes of consumables used to drill and complete a horizontal well can be many times that of a typical vertical well. The directional nature of the well also creates a spacing question. In a typical vertical development, spacing is based on assuming somewhat omnidirectional reservoir drainage. A grid can be established allowing for a reasonably accurate count of wells to plan by. Horizontal wells must set a maximum well length (completable lateral), and a distance between the wells. The length and spacing variables affect the total number of wells required to develop the field considerably. Reducing the spacing between the wells by half would roughly double the number of wells required. For multi-well pad operations, it also increases the amount of time a drilling rig remains in an area. Typical day rates for drilling rigs now (mid-2012) range from tens to hundreds of thousands of $US/day.

Traditional logic-based planning requires that a predecessor activity is completed before its successor can begin. This is applied for the activities that define the drill & equip of a well, but not for the order the wells will be developed. Since the location and number of future wells is unknown, it is impossible to use logic to plan effectively. Predecessor/successor logic can be used for well pads (i.e., all wells on a pad must be drilled before the first well can be completed) but resource priority is used to determine the order of the activity. Since each well has it's own critical path, and the "project finish" is only the latest well in the schedule, the true "critical path" has little meaning when using scheduling software for resource based operational planning/scheduling. CPM scheduling methods and tools are not ideally suited for this type of planning, because the goals are different.

Simultaneous Operations ("SIMOPS") is a very necessary planning consideration. Drilling rigs must increase mud weight to hold back induced pressure from a nearby frac crew. The risk being that the rig can not "mud up" fast enough, or any uncased zones already drilled through would not be able to hold up to the increased mud weight, resulting in well control issues ranging from loss of circulation to a blowout. Planning to keep enough distance between rigs and frac crews is necessary. In addition to the "point in time" spatial conflict, the residual pressure can also affect future drilling operations. There is an "ideal" time to return to an area to resume drilling after frac operations have finished.

Having identified the above problems, it would be an advance in the resource planning art if methods, systems, and computer-readable media were available to reduce or overcome some or all of the above problems seen in currently available planning methods and systems. More specifically, it would be an advance in the resource planning art if methods, systems, and computer-readable media were available to enable presently known or future CPM planning/scheduling software to perform resource constrained operational planning, for example, but not limited to, horizontal well development planning (upstream activity).

SUMMARY

In accordance with the present disclosure, methods, systems, and computer-readable media are described which reduce or overcome one or more of the above problems.

A first aspect of the disclosure is a method comprising:
  a) storing operational scheduling data for a project having one or more project assets, the project assets able to perform a plurality of operational activities at defined coordinates, in a scheduling database;
  b) storing project-specific variables for the project in an external data source;
  c) executing a database query of the scheduling database and the external data source using a computer, returning all possible combinations of the plurality of operational activities, including:
    i) defining a common reference;
    ii) calculating distances from each defined coordinate to each other defined coordinate;
    iii) filtering the calculated distances to filter out potential operational conflicts selected from the group consisting of one or more user defined distances, operational activities having no time conflicts, and distances greater than one or more user-defined buffer distances; and
  d) identifying potential simultaneous operational activity conflicts using a tabular output format displayed on a user interface electronically connected to the computer.

A second aspect of the disclosure is a method comprising:
  a) storing operational scheduling data for a project having one or more project assets, the project assets able to perform a plurality of operational activities at defined state plane coordinates, in a scheduling database;

b) storing project-specific variables for the project in an external data source;

c) transforming, using software accessible by the computer, the state plane coordinates from a state plane coordinate system to Earth coordinates in an Earth coordinate system specified for a computer language able to express geographic annotation and visualization within one or more Internet-based, two-dimensional electronic maps and/or three-dimensional electronic Earth browsers displayed on a viewer electronically connected to the computer, thus forming a transformed scheduling database;

d) executing a database query of the transformed scheduling database and the external data source using a computer, returning all possible combinations of the plurality of operational activities, including:
  i) defining a common reference;
  ii) calculating distances from each Earth coordinate to all other Earth coordinates;
  iii) filtering the calculated distances to filter out potential operational activity conflicts selected from the group consisting of one or more user defined distances, operational activities having no time conflicts, and distances greater than one or more user-defined buffer distances;

e) formatting unique icons for each operational activity and placing the icons on the electronic map and/or electronic Earth browser using the viewer and a user interface electronically connected to the computer;

f) specifying one or more Earth coordinates and/or geometries for each operational activity and placing these on the electronic map and/or electronic Earth browser using the viewer and user interface;

g) specifying visual buffer area geometries for the project assets according to the state plane coordinates using the user interface;

h) visually overlaying one or more of the visual buffer area geometries on one or more of the project assets and operational activities using the viewer and user interface; and i) visually identifying potential simultaneous operational activity conflicts by viewing the overlaid visual buffer areas using the viewer.

A third aspect of the disclosure is a method comprising:

a) forming a first database of estimated dates of first production of a product or service from a plurality of project assets, and a second database of type curves for the project assets;

b) performing a Cartesian join of the first and second databases to obtain a Cartesian product;

c) summing results of the Cartesian product to obtain a third database of aggregate production rates at each project asset;

d) executing a database query of the third database at each project asset using a computer, returning aggregate production rates for each project asset for a user-defined time period;

e) comparing, using the computer, the aggregate production rates of each project asset to a project asset maximum rate for each project asset stored in the second database;

f) displaying, on a user interface electronically connected to the computer, a "percent loaded value" for one or more of the project assets per user-selected time period; and g) forecasting, using the computer, a "100 percent loaded" date for one or more of the project assets.

Other aspects of the disclosure are systems for carrying out the methods, and computer-readable media encoded with processing instructions for implementing the various methods with the systems.

Methods, systems, and computer-readable media of this disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 1:
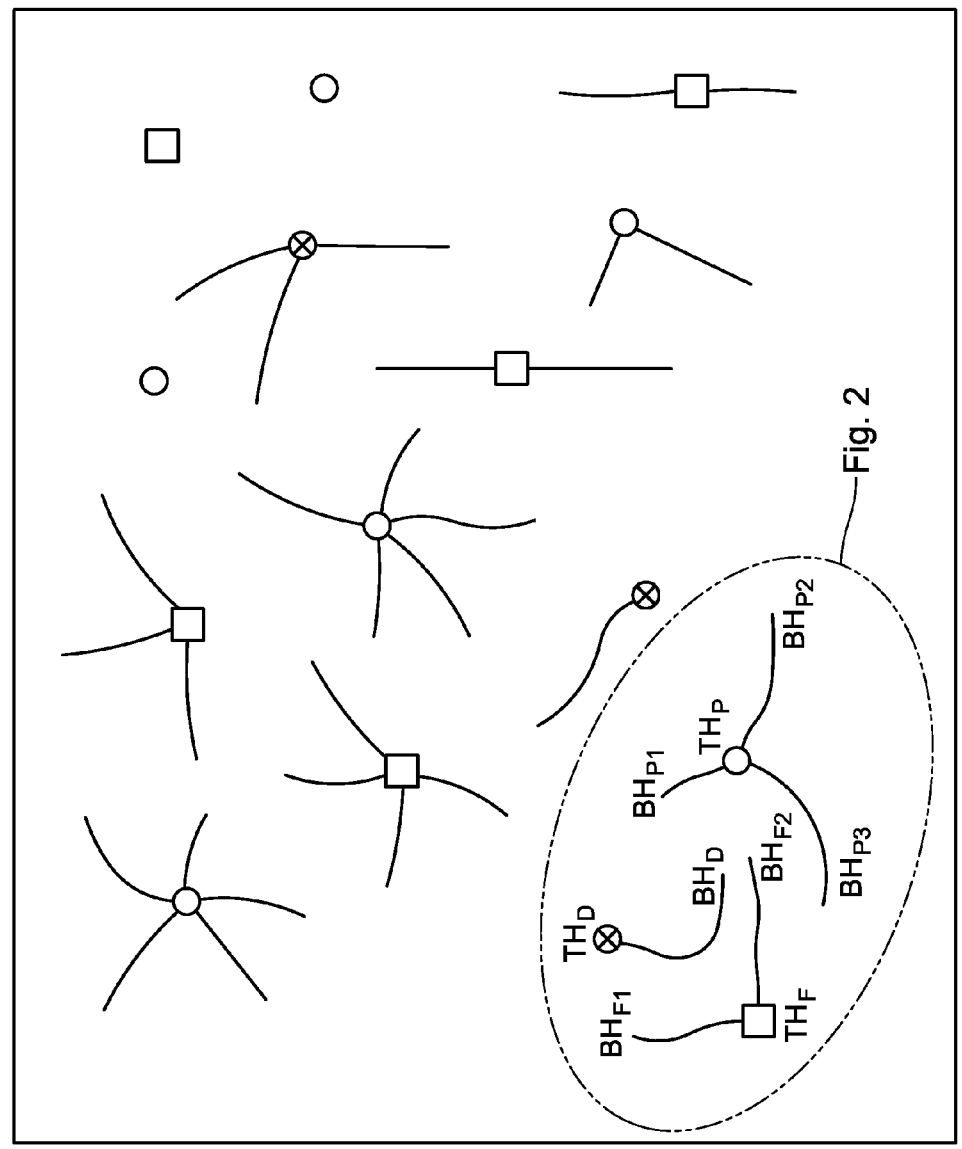
FIGS. 1-4 are schematic views of projects that may benefit from the systems, methods, and computer-readable media of the present disclosure.

It is to be noted, however, that the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed systems and methods. However, it will be understood by those skilled in the art that the systems and methods covered by the claims may be practiced without these details and that numerous variations or modifications from the specifically described embodiments may be possible and are deemed within the claims. All U.S. published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling.

As explained briefly in the Background, CPM scheduling methods and tools are not ideally suited for resource-based operational planning/scheduling. For example, in the hydrocarbon well drilling, completion, and production field, since each well has its own critical path, and the "project finish" is only the latest well in the schedule, the true "critical path" has little meaning when using scheduling software for CPM for this type of planning, because the goals are different. Applicant has discovered certain methods, systems, and computer-readable media (software) that are advances in the resource planning art. Certain embodiments, when used with or in place of presently known or future CPM planning/scheduling software, are able to perform resource constrained operational planning, for example, but not limited to, horizontal well development planning (upstream activity). For example, certain embodiments of systems, methods and computer-readable media of the present disclosure allow spotting conflicts between drill and completion activities (for example, but not limited to, hydraulic fracturing, or "Tracing"). Other embodiments may be used to find flowback reclamation opportunities (frac and flowback in close proximity both in distance and time). Yet other embodiments may be useful to indicate which current producers need to be shut in for or during a frac activity. Still other embodiments may use either the first method or second, or both in combination, in any other type of operational planning, for example facility "turnaround" and maintenance (onshore or offshore), brownfield projects (projects executed on or in existing production facilities), onshore commissioning, offshore facility integration, offshore HUC (Hook Up and Commissioning), or any other application where SIMOPS incompatible activities must occur in a confined area.

Various terms are used throughout this disclosure. As used herein the term "project" is to be defined broadly as a plurality of tasks or planned program of work, except when a more specific project is being discussed, such as a horizontal well development project. A more precise definition of "project" may be a temporary endeavor with a defined beginning and end (usually time-constrained, and often constrained by funding or deliverables), undertaken to meet unique goals and objectives, typically to bring about beneficial change or added value. The temporary nature of projects stands in contrast with business as usual (or operations), which are repetitive, permanent, or semi-permanent functional activities to produce products or services. In practice, the management of these two systems is often quite different, and as such requires the development of distinct technical skills and management strategies. "Project management" is the discipline of planning, organizing, securing, managing, leading, and controlling resources to achieve specific goals. See for example, Chatfield, Carl, "A short course in project management", Microsoft; "*The Definitive Guide to Project Management*", Nokes, Sebastian, 2nd Edn., London (Financial Times/Prentice Hall): 2007; Paul C. Dinsmore et al (2005) *The right projects done right*! John Wiley and Sons, 2005. p. 35 and further.

The term "project asset" as used herein means simply a device, component, chemical, machine, software, and the like that is used in a project, and whose use is to be managed in time, space, and budget. "Project assets" may be consumable (for example, but not limited to, chemicals) or non-consumable (for example, but not limited to, drilling rigs, pipe or conduit sections, coiled tubing, downhole tools, well heads, pumps, trucks, and the like).

The term "operational activity" means an activity or activities able to be performed by one or more project assets. For example, drilling is an operational activity, as is hydraulic fracturing (sometimes simply referred to herein as "fracing"). The phrase "potential operational activity conflicts" means potential time, space, and/or budget conflicts that might prohibit or interfere with efficient completion of an operational activity, whereas the phrase "potential simultaneous operational activity conflicts" means potential time conflicts that might prohibit or interfere with efficient completion of an operational activity.

Certain method embodiments of this disclosure may include methods wherein the project is selected from the group consisting of hydrocarbon exploration projects, hydrocarbon production projects, hydrocarbon well drilling projects, hydrocarbon well completion projects, hydrocarbon well intervention projects, hydrocarbon containment and disposal projects, projects involving two or more of these types of projects simultaneously in time and at nearby Earth coordinates, and projects involving two or more of these types of projects nearly simultaneously in time and at nearby Earth coordinates.

Certain method embodiments of this disclosure may include methods wherein the project comprises hydrocarbon horizontal drilling, hydrocarbon production, and hydrocarbon well completion, wherein at least one or more of the well completions involves hydraulic fracturing.

Certain method embodiments of this disclosure may include methods wherein the project is a resource exploration project, where the resource may be hydrocarbon or non-hydrocarbon, for example, copper, iron, gold, or other metal. Certain methods may be non-hydrocarbon resource production methods, for example, but not limited to copper, iron and gold production projects.

Certain method embodiments of this disclosure may include methods wherein the defining of a common reference comprises creating a table of drilling coordinates and fracturing coordinates, wherein the drilling coordinates are on a left side of the table and the fracturing coordinates are on a right side of the table.

Certain method embodiments of this disclosure may include methods wherein the identifying of potential simultaneous operational conflicts using a tabular output format displayed on a user interface electronically connected to the computer comprises a user using a wireless connection between the user interface and the computer. (As used herein the phrase "electronically connected" means either wireless, wired, or both.)

Certain method embodiments of this disclosure may include methods wherein the filtering of the calculated distances to filter out potential operational conflicts comprises filtering one or more user defined distances from an operator's own well and pad operations.

Certain method embodiments of this disclosure may include methods wherein the computer is selected from the group consisting of a hand-held computer, a laptop computer, a desktop computer, and a tablet computer.

Certain method embodiments of this disclosure may include methods wherein the one or more project assets are selected from the group consisting of one or more drilling rigs, one or more slurry blenders, one or more high-pressure, high-volume fracturing pumps, one or more monitoring units, one or more fracturing tanks, one or more units for storage and handling of proppant, one or more high-pressure treating irons, one or more chemical additive units to accurately monitor chemical addition, low-pressure flexible hoses, and gauges and meters for flow rate, fluid density, and treating pressure.

Certain method embodiments of this disclosure may include methods wherein the project is an offshore seismic exploration project, and the one or more project assets are selected from the group consisting of one or more vessels, one or more streamer cables containing acoustic and/or electromagnetic (EM) seismic receivers deployed into water behind one or more of the vessels, one or more seismic sources towed by the same or different vessel, wherein the vessels, streamers, and sources define a seismic spread, one or more GPS receivers at strategic points in the spread to determine the surface position of a vessel, one or more buoys tethered to streamers and sources, one or more streamer controllers, one or more deflectors for pulling streamers laterally, one or more lateral source steering mechanisms, and one or more winch mechanisms.

In the specific context of horizontal well development planning/scheduling, certain methods and computer-readable media (referred to alternatively as "software" herein) of the present disclosure may be referred to as SHALE PLAN™, although this disclosure is explicitly not so limited. The software currently known under the trade designation SHALE PLAN™ was developed to meet certain unique needs of horizontal well development planning. In certain embodiments, the software comprises:

a) One or more Keynote Markup Language ("KML") file outputs showing:
   i) Planned future drilling activity (indicated by one or more surface location icons, and a line approximating the wellbore to the bottom hole ("BH") location;
   ii) Planned future hydraulic fracturing activity (indicated by a surface location icon), a line approximating the wellbore to the bottom hole location ("BHL"), and an "exclusion zone" buffer geometry. An exclusion zone, indicated by one color (for example, red), and a "watch window" indicated by another color (for example, yellow) gives scale to the relative position of each drill and frac activity. If a drilling activity shows up inside of the frac buffer geometry that indicates a problem.
b) One or more tabular reports of time and distance between operational activities. The same data used to generate the KML files can also:
   i) Create tabular reports showing the number of days from drilling rig release to the nearest frac activities. In one method embodiment, positive numbers may indicate the number of days of slip until a problem occurs, zero may indicate the frac starts on the same day as the close drilling activity finishes; and a negative value may indicate the frac is forecasted to begin before the near drilling activity finishes.
   ii) Calculate the latest rig release date in the vicinity of the frac. This "SIMOPS" (simultaneous operations) hold date may be one of the 3 main constraints.
   iii) Since holding offset well pads due to SIMOPS increases the "Spud to Sales" time which is typically used as a Key Performance Indicator ("KPI") for determining the lag duration from investment to revenue generation, a value can be stored for the possible frac schedule scenario to be used as an optimization criteria.
c) A facility loading forecast tool. By including the "type" data for each fluid type (oil, water, gas, natural gas liquid ("NGL"), and the like) and knowing the start date, a daily production report can be created. Base production can also be added to this to give a true throughput value instead of simply an "incremental" gain in production.
   i) Production rates through each facility or project asset can be summed by day and compared to the user defined limit of the facility. This allows the team to forecast facility loading based on a possible frac schedule.
   ii) Field wide water can be summed (rate by day) and compared to a user defined SWD (disposal well) max rate;
   iii) Facility utilization (over or under loading) can be summed and stored as a value for a possible frac schedule to optimize for facility loading.
d) Fresh water requirements
   i) In certain embodiments, frac schedules depend heavily on the availability of fresh water. By storing a user defined "refill time" the software application can forecast when the next water source available date is based on the finish date of the last frac using the water source. This becomes one of the 3 main constraints.
   ii) Modeling water availability may be difficult in certain embodiments. The user may also specify a custom "Start On or After" constraint date for water availability.
e) Shut-ins for offset frac activities. Fracs near existing producing wells often flood the producing wells with frac water. It may be advantageous to the operator to shut in a producing well during the frac (so as not to overwhelm a production facility with water), then send a flowback crew to unload the producer and return it to service.
   i) By knowing the location of past fracs (proxy for existing producers) an "Offset shut in" report may be generated showing all producers within a distance of a planned frac.
   ii) The report may be viewed visually as a KML file using the same method as above, with custom buffer geometry surrounding fracs indicating how far away to shut in wells;
   iii) Certain methods may use existing company GIS systems to view KML files with a base layer of existing producing wells if the software known under the trade designation SHALE PLAN™ and the scheduling software (P6 or other) does not have enough development history to produce a meaningful report;
   iv) By knowing the production rate of the offset producers, an "impact to production" value may be calculated for the possible frac schedule to be used as an optimization criteria.

By storing multiple "possible schedules" (hydraulic fracturing honors all 3 constraints: rig release of own pad+prep time, rig release of all offset pads within the exclusion distance, and water is available) many possible schedules can be generated. Once there are options, a system for ranking them may be beneficial. For example, each possible schedule may be assigned a score (domain aggregate function) that represents: 1) existing facility utilization (%), 2) impact to existing production barrels of oil equivalent/day (boe/d), and 3) "Spud to Sales" average duration. The user may then sort the possible schedules ascending or descending on the 3 criteria in any order they choose to determine which schedule scenario is the best choice.

To facilitate ease of use getting data in and out of certain method and software embodiments such as that known under the trade designation SHALE PLAN™, a back-end software, such as the software known under the trade designation SQL™ server, or software known under the trade designation Oracle™ database connection may be preferred. DSN (data source name) ODBC connection may be used to facilitate the data transfer. Users who do not have software known under the trade designation PRIMAVERA™ installed on their computer may map a MS Project™ or an XLS file to the software known under the trade designation SHALE PLAN™.

Certain embodiments of methods, systems and computer-readable media of the present disclosure may comprise on or more of the following features:
1) Full blown scheduling software, eliminating the need for using software products such as those known under the trade designations PRIMAVERA™ or MS PROJECT™;
2) Risk analysis (for example, Monte Carlo simulations) to find duration sensitivity and "most likely scenarios";
3) Auto Scenario generation (for example, auto-create multiple "What IF" schedules), rank and score each scenario. Creates all possible combinations, instead of requiring the user to think of them.

Specific non-limiting system, method and computer-readable media embodiments in accordance with the present disclosure will now be presented in conjunction with FIGS.

1-7. The same numerals are used for the same or similar features in the various figures. In the views illustrated in FIGS. 1-7 it will be understood in each case that the figures are schematic in nature, and certain conventional features are not illustrated in order to illustrate more clearly the key features of each embodiment.

FIG. 1 is a schematic plan view of a horizontal drilling, hydraulic fracturing, and hydrocarbon production project that may benefit from systems, methods, and computer-readable media of the present disclosure. Illustrated schematically is a field 100 being developed, with different icons denoting project assets. For example, a circle icon represents a hydrocarbon producing well, a crossed-circle icon represents a well being drilled or already drilled well, and a box icon represents a hydraulic fracturing site. These icon shapes are completely arbitrary and may be set as desired by a user. Lines emanating from each icon represent underground well paths. A lower left-hand portion of FIG. 1 is enlarged as FIG. 2, and attention is now drawn to FIG. 2.

Figure 2:
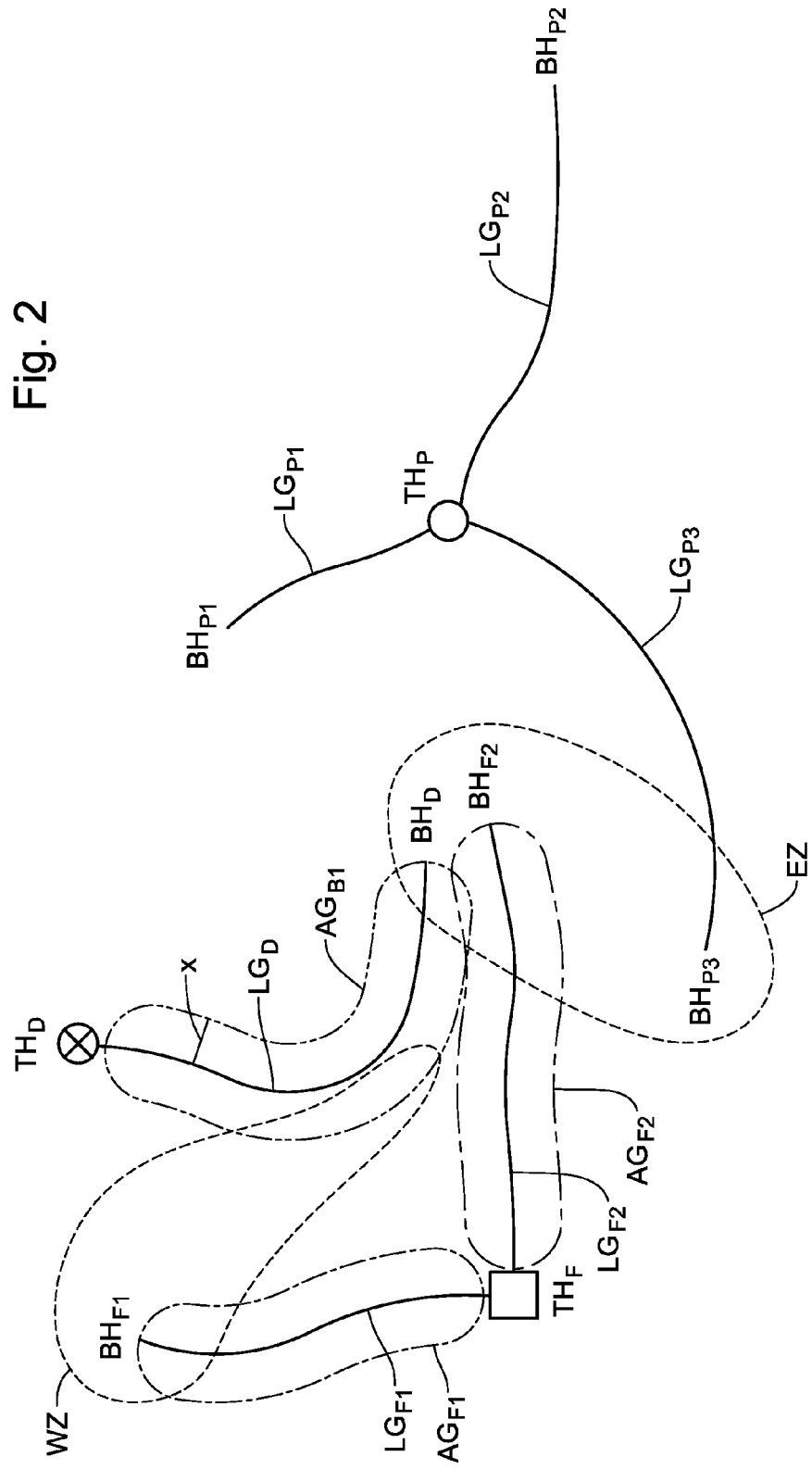

Referring now to FIG. 2, note that labels have been given to features of each project asset, and certain further features of methods, systems and computer-readable media of the present disclosure will now be pointed out. The box icon labeled $TH_F$ denotes a top hole of the fracing site, while the labels $BH_{F1}$ and $BH_{F2}$ denote bottom holes 1 and 2 for the wells. Labels $LG_{F1}$ and $LG_{F2}$ denote line geometries or well paths for the two fracing paths. A similar labeling system may be used for the drilling and hydrocarbon production assets, with $TH_D$ indicating top hole for the drilling site denoted with the crossed-circle icon, $BH_D$ denoting the bottom hole for the drilling activity, and $LG_D$ indicating a line geometry for the drilling activity from the drilling site labeled with the crossed-circle icon. Similarly, a label $TH_P$ indicates the top of hole for the hydrocarbon production site denoted by the circle icon, with labels $BH_{P1}$, $BH_{P2}$, and $BH_{P3}$ indicating the bottom of those respective wells. Finally, the actual production well paths (line geometries) are labeled $LG_{P1}$, $LP_{G2}$, and $LP_{G3}$.

In accordance with the present disclosure, and still referring to FIG. 2, note that several dashed and dotted areas are denoted. A dotted line labeled $AG_{B1}$ denotes a buffer area or "area geometry buffer 1", having a width two times ("2x") the user defined buffer distance. Buffer area $AG_{B1}$ denotes a geographic area, viewable on a computer screen, where other operational activities are not supposed to be happening while drilling is taking place. A dashed geometric area labeled EZ indicates an "exclusion zone", where either fracing or drilling should be stopped during time periods when hydrocarbons are being produced through $LG_{P3}$, since $BH_{P3}$ is so close to $BH_{F2}$ and $BH_D$ that flowback could occur (in other words, rather than line geometry LGP3 producing hydrocarbons, it may produce drilling or fracing fluids, and/or produced water or other non-desired fluids). Other area geometries are noted at $AG_{F1}$ and $AG_{F2}$, denoting the fracing buffer areas, and a "watch zone" area, where for example it may be acceptable to frac through $LG_{F1}$ while drilling well geometry $LG_D$, but the operator should be mindful that this area should be monitored carefully. In accordance with the present disclosure, the icons, line geometries, and area geometries may be colored with different colors, and even filled in with color (in the case of area geometries), aiding visual identification and monitoring.

Figure 3:
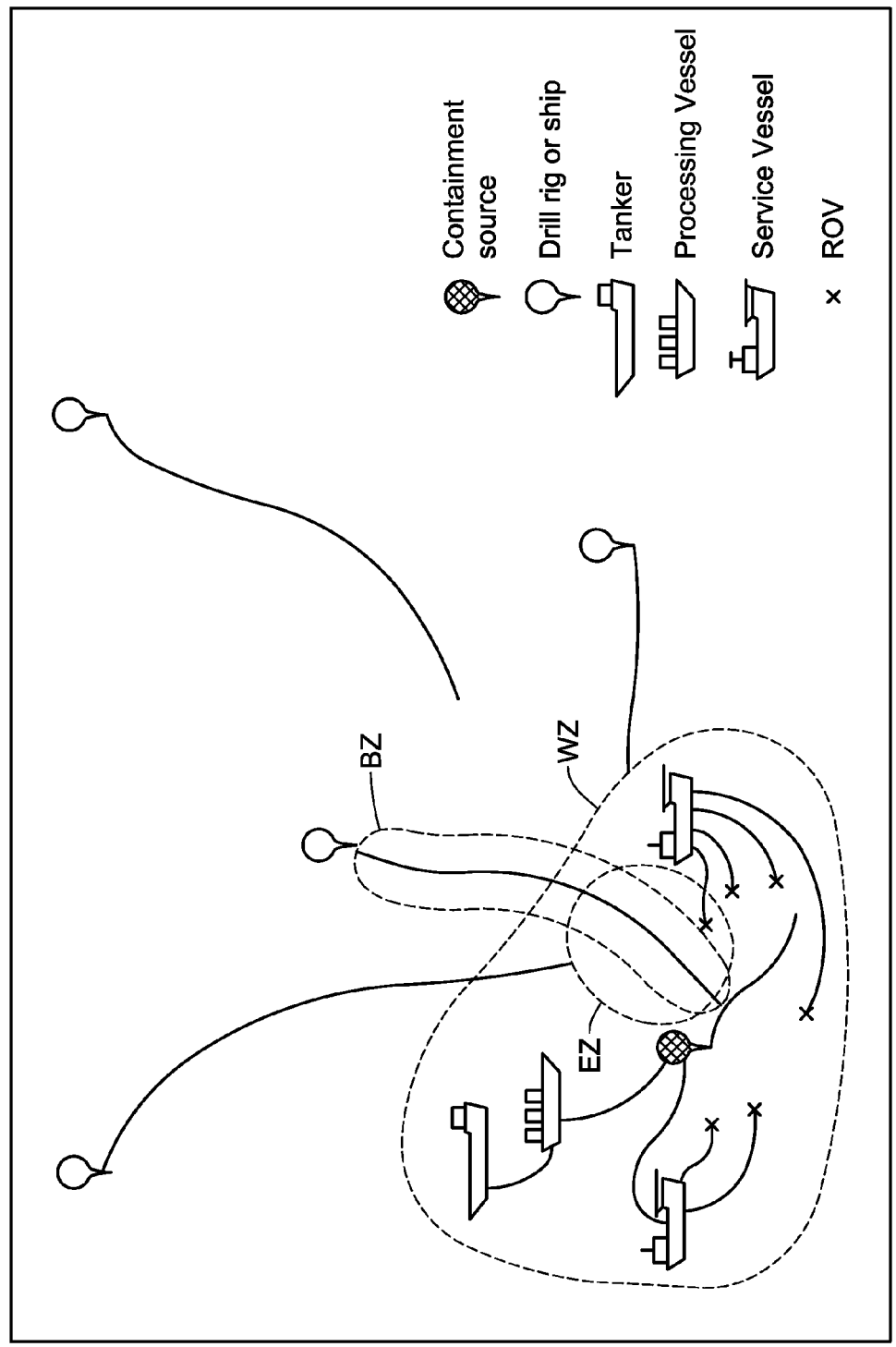

Referring now to FIG. 3, FIG. 3 is a schematic plan view of a marine hydrocarbon containment, production, and drilling project that may benefit from systems, methods, and computer-readable media of the present disclosure. Illustrated schematically is a marine field 200 being developed, with different icons denoting project assets. For example, an open balloon icon represents a drilling rig or drill ship, and a filled-balloon icon represents a hydrocarbon containment source that was previously a hydrocarbon production source; in other words, a problem such as a blowout has occurred requiring a containment effort. Other icons represent various marine vessels as denoted in the legend at the lower right hand side of FIG. 3. For example, one vessel icon may represent a tanker, another vessel icon may represent a fluid processing vessel (for example for separating hydrocarbons and water, and for separating hydrocarbons into gas and liquid phases). Another vessel icon may represent a service vessel. Finally, an "X" may represent an underwater remotely-operated vehicle (ROV). Once again it should be emphasized that these icon shapes are completely arbitrary and may be set as desired by a user. Lines emanating from each open balloon icon represent underground well paths. In embodiment 200 it may be appropriate to define the entire geometric area around the containment source as a watch zone, WZ, and an area EZ a separate exclusion zone around the area where a relief well is being drilled from the drill ship having the buffer zone, BZ. The containment source, and associated equipment to contain and collect hydrocarbons, may route fluids to a processing vessel as illustrated, and further offload hydrocarbons to a tanker vessel. Containment and production of hydrocarbons in this fashion is explained in more detail in published U.S. patent application no. 2012/0085544 A1, published Apr. 12, 2012. In accordance with the present disclosure, the icons, line geometries, and area geometries may be colored with different colors, given three-dimensional shapes, and even filled in with color (in the case of area geometries) using a language such as KML, aiding visual identification and monitoring.

Figure 4:
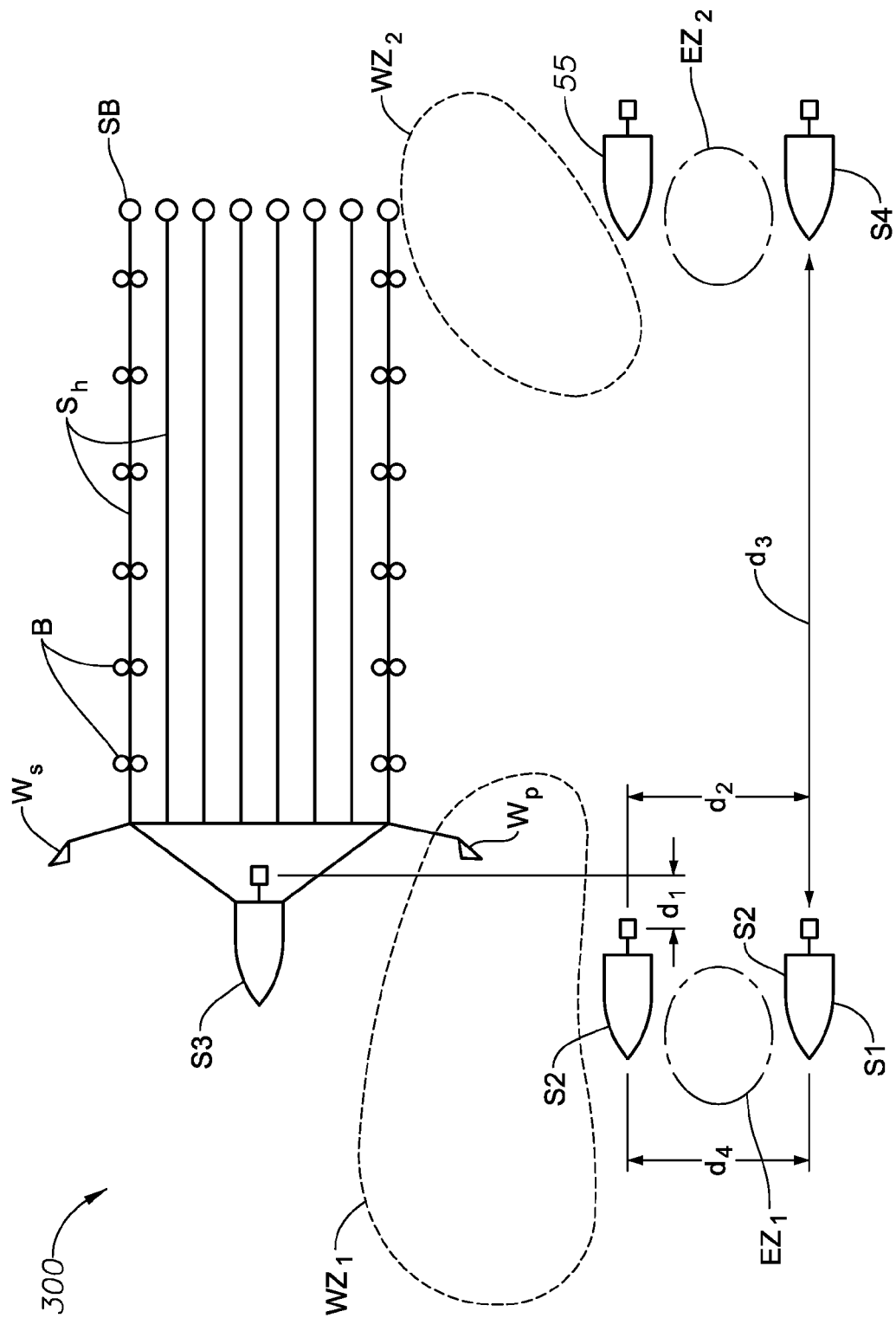

Referring now to FIG. 4, FIG. 4 is a schematic plan view of a marine seismic surveying project that may benefit from systems, methods, and computer-readable media of the present disclosure. FIG. 4 here uses FIG. 2 of U.S. Pat. No. 7,400,552 as its basis. Illustrated schematically is a marine field being seismically scanned, with different icons denoting project assets. For example, vessel icons represent tow vessels and their associated seismic sources S1, S2, S4, S4 and S5, box icons denote seismic sources, horizontal lines $S_n$ represent seismic streamers (cables filled with seismic sensors and other equipment known and used in the marine seismic surveying art), wing-shaped icons labeled $W_S$ and $W_P$ represent passive or active steerable wings, starboard and port, respectively, FIG. 8 icons represent streamer controllers (commonly referred to as "birds"), and circle icons labeled SB indicate steerable buoys. The embodiment of FIG. 4 illustrates four source-only tow vessels and their associated sources S1, S2, S4, and S5, while a source-streamer tow vessel and its associated source S3 also tows eight streamers Sn. In this representative embodiment, all source-only tow vessels are on the port side of the streamers. They could just as well all be on the starboard side. Distance d1 represent a distance between sources associated with source-only tow vessel S1 and the source associated with source-streamer tow vessel S3. Distance d1 also represents the distance between the source associated with source-only tow vessel S2 and the source associated with source-streamer tow vessel S3. Distance d1 may vary as desired for any particular survey; in this embodiment distance d1 is about 1000 meters. Distance d2 represents the distance between sources associated with source-only tow vessels S1 and S2, as well as the distance between sources associated with source-only tow vessels S4 and S5. Distance d2 between S1 and S2 may be substantially equal to the distance d2 between S4 and S5, although exact identity is not required. Distance d2 may also vary as desired for any particular survey; in this embodiment distance d2 is about 1000 meters. Distance d3 represents the distance in the X-coordinate between sources towed by source-only tow vessels S1 and S4, as well as between the sources towed by source-only tow vessels S2 and S5, although the distances S1-S4 and S2-S5 may be the same or different. Distance d3 may vary as required by any particular survey; in this embodiment distance d3 is about 12000 meters, but could be 30000 m or more. Distance d4 represents the distance in the Y-coordinate between the source towed by source-only tow vessel S2 and the source associated with source-streamer vessel S3. Distance d4 may vary as required by any particular survey; in this embodiment distance d4 is about 2000 meters.

In accordance with the present disclosure, and still referring to FIG. 4, two watch zones $WZ_1$ and $WZ_2$ may be overlaid as illustrated, as well as two exclusion zones $EZ_1$ and $EZ_2$ as illustrated. Buffer zones may be overlaid around each streamer Sn and/or around all of the streamers, but are not illustrated here for clarity. Furthermore, marine obstructions may be given icons, such as drilling rigs other vessels, and the like, and these are not illustrated to avoid overly clouding FIG. 4.

Examples of how to construct KML placemarks (also referred to herein as icons), descriptive HTML in placemarks, ground or marine overlays, screen overlays, paths, polygons, and other viewable features is publicly available, for example on the Internet. In particular, several KML software coding examples are currently provided and accessible at Google, Inc.'s "Google Developers" website in a document entitled "KML Tutorial". As there explained, "A Placemark is one of the most commonly used features in Google Earth. It marks a position on the Earth's surface, using a yellow pushpin as the icon. The simplest Placemark includes only a <Point> element, which specifies the location of the Placemark. You can specify a name and a custom icon for the Placemark, and you can also add other geometry elements to it." The tutorial further notes that there are three different types of placemark: simple, floating, and extruded. "The KW, code for the simple placemark looks like this:

```
<?xml version="1.0" encoding="UTF-8"?>
<kml xmlns="http://www.opengis.net/kml/2.2">
    <Placemark>
        <name>Simple placemark</name>
        <description>Attached to the ground. Intelligently places itself
            at the height of the underlying terrain.</description>
        <Point>
            <coordinates>-122.0822035425683,37.42228990140251,0</coordinates>
        </Point>
    </Placemark>
</kml>
```

According to Google, Inc. The structure of this file breaks down as follows:
1. An XML header. This is line 1 in every KML file. No spaces or other characters can appear before this line,
2. A KML namespace declaration. This is line 2 in every KML, 2.2 file.
3, A Placemark object that contains the following elements:
   A name that is used as the label for the Placemark
   A description that appears in the "balloon" attached to the Placemark
   A Point that specifies the position of the Placemark on the Earth's surface (longitude, latitude, and optional altitude)."

What users commonly think of as a "placemark" in Google Earth is actually a <Placemark> element with a <Point> child in KML. A Point Placemark is the only way to draw an icon and label in the 3D Viewer of Google Earth. By default, the icon is the familiar yellow pushpin. In KML, a <Placemark> can contain one or more geometry elements, such as a LineString, Polygon, or Model. But only a <Placemark> with a Point can have an icon and label. The Point is used to place the icon, but there is no graphical representation of the Point itself."

The above-reference tutorial discusses many other examples, and the tutorial is incorporated herein by reference for those coding examples.

Figure 5:
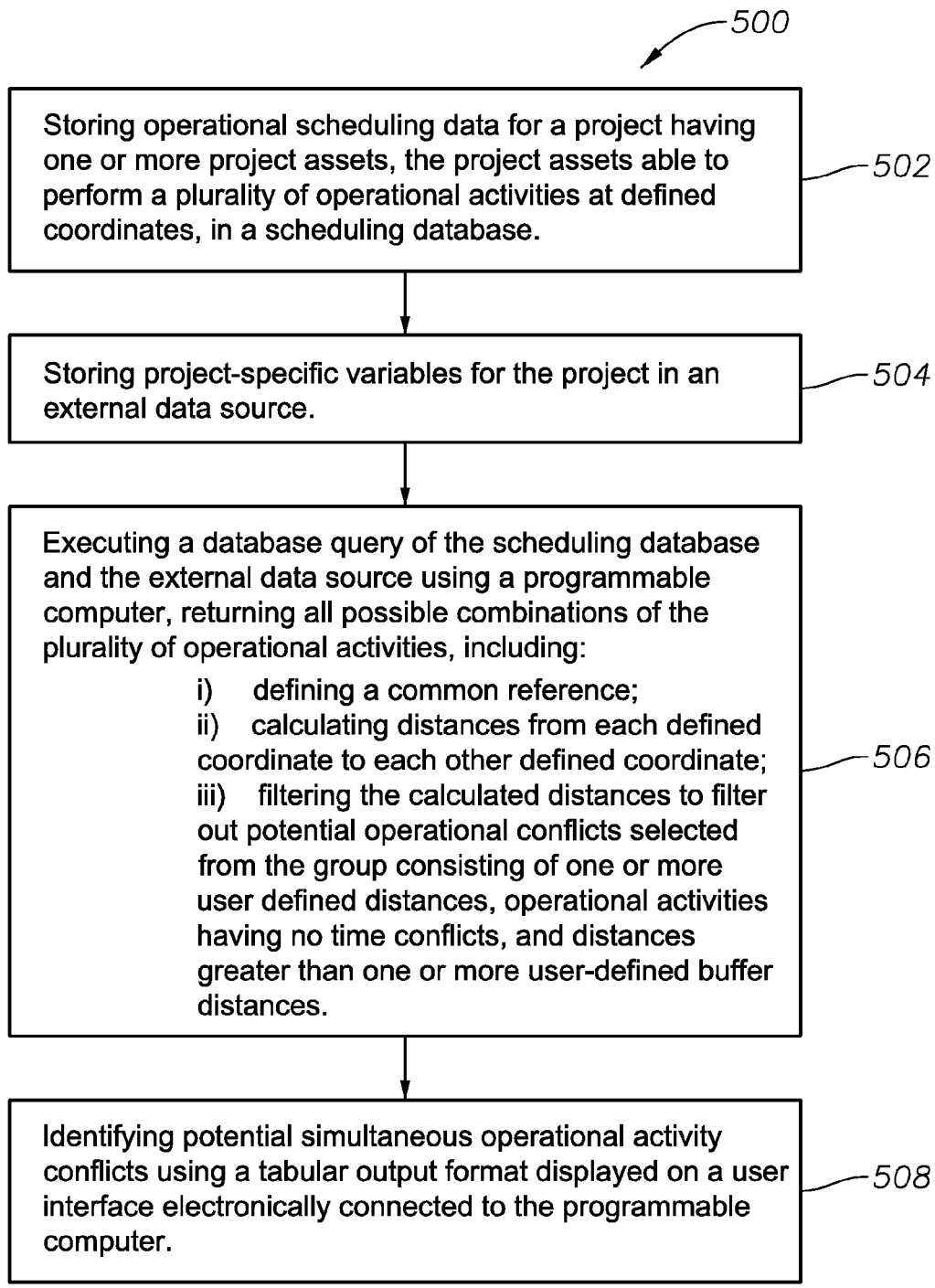
FIGS. 5-7 are logic diagrams of three method embodiments of the present disclosure.
Figure 6A:
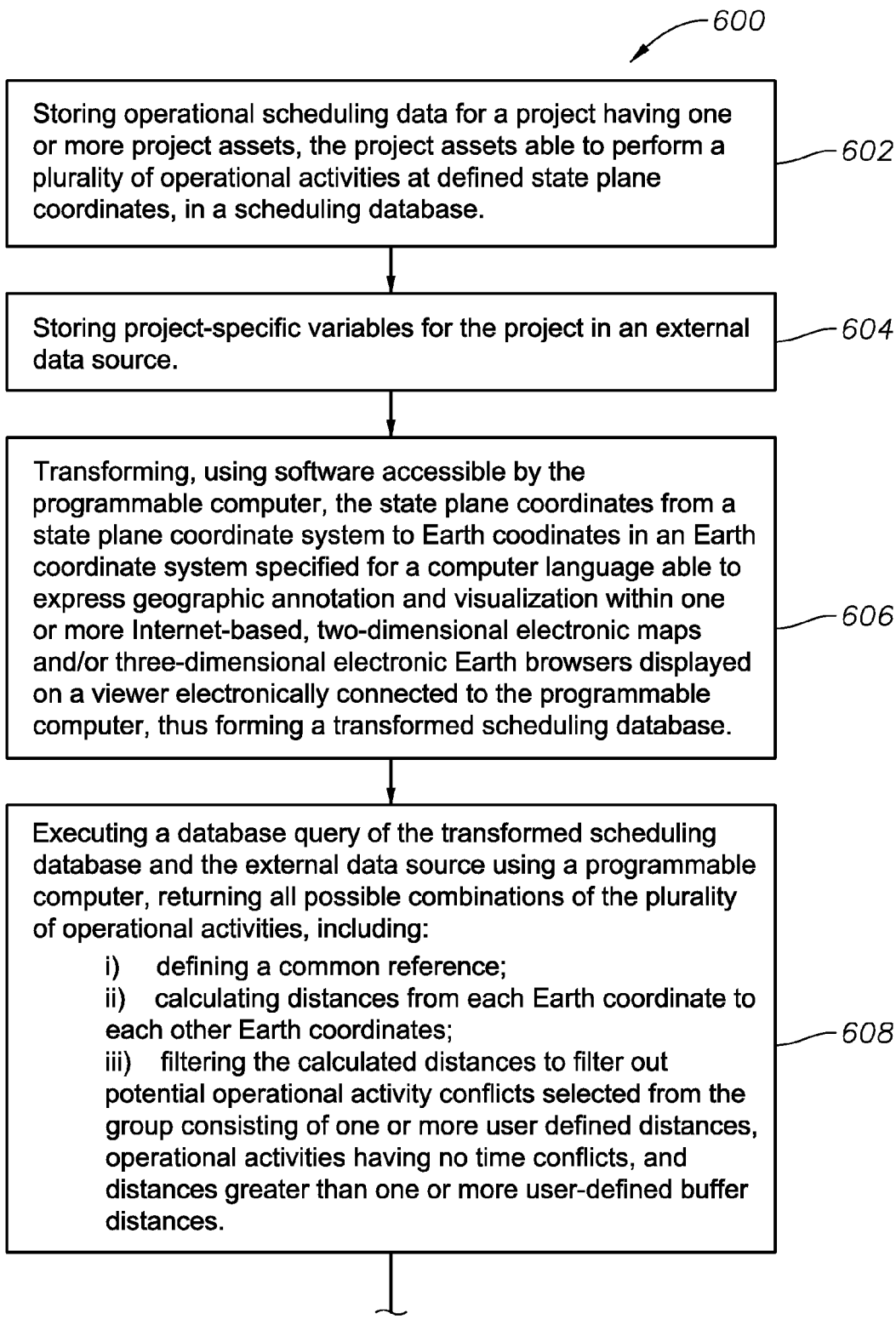
Figure 6B:
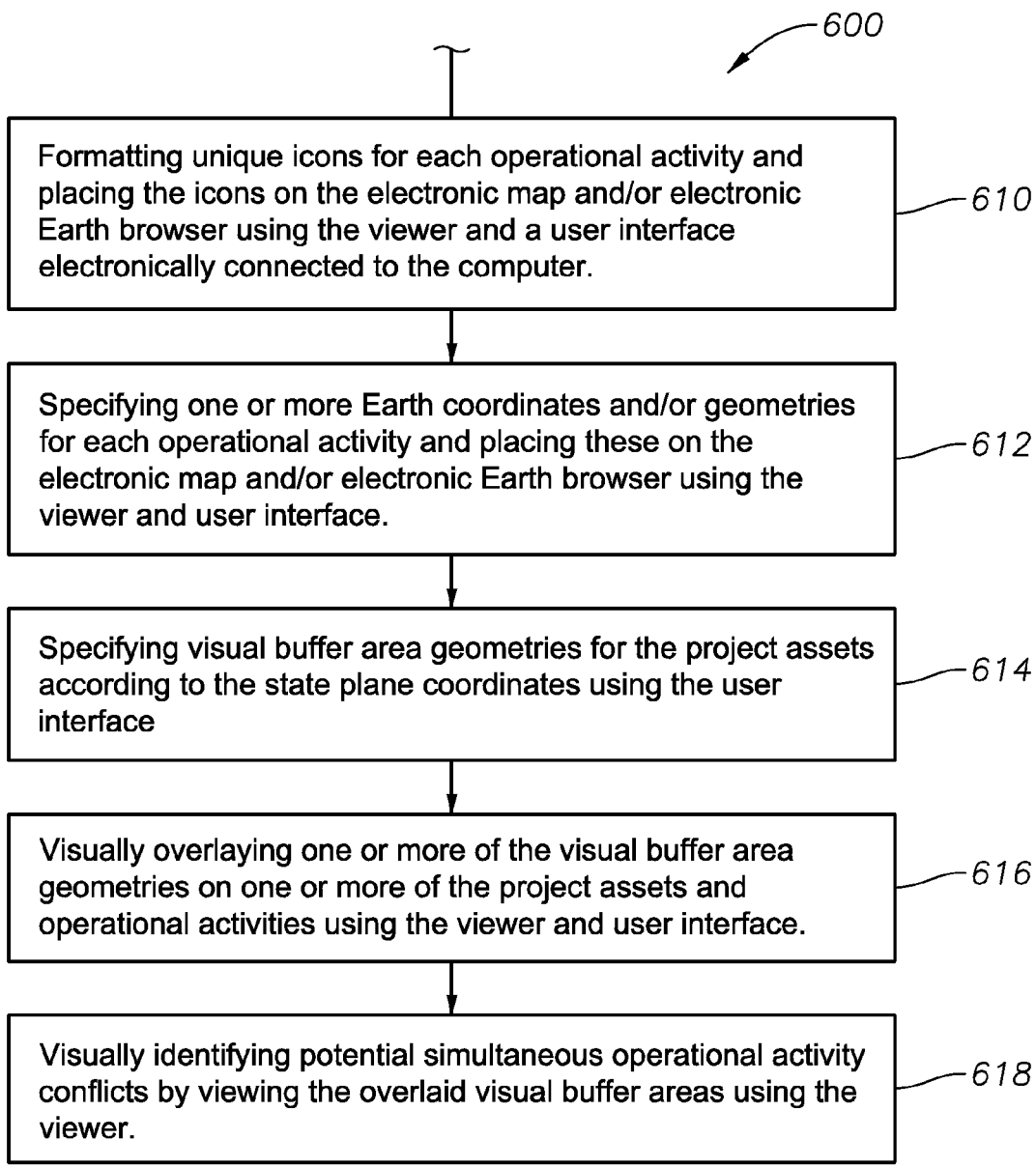
Figure 7:
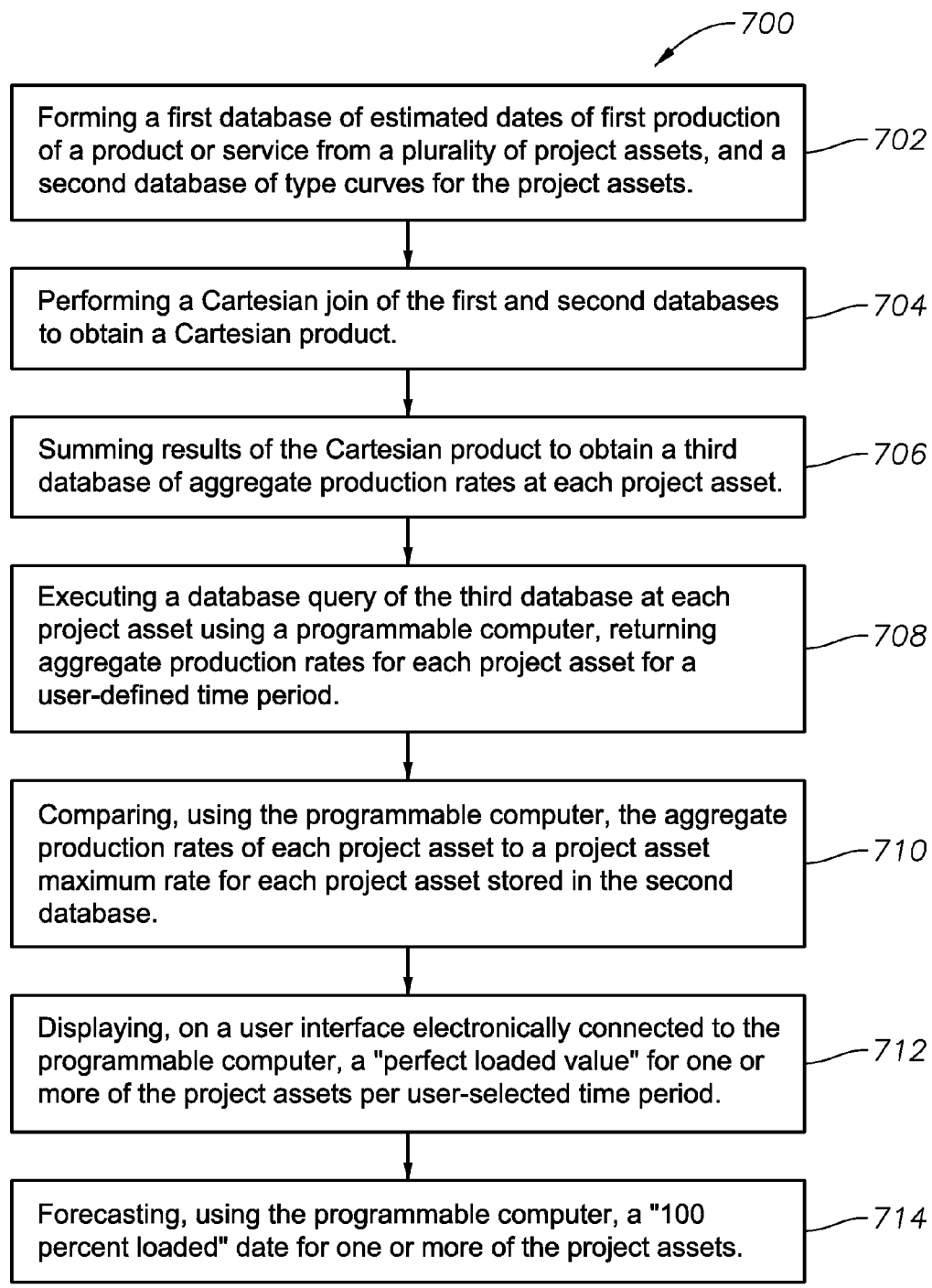

FIGS. 5, 6 and 7 are logic diagrams of three non-limiting method embodiments 500, 600, and 700 in accordance with the present disclosure. Method embodiment 500 comprises storing operational scheduling data for a project having one or more project assets, the project assets able to perform a plurality of operational activities at defined coordinates, in a scheduling database, box 502. This method further comprises storing project-specific variables for the project in an external data source, box 504. The method further comprises executing a database query of the scheduling database and the external data source using a computer, returning all possible combinations of the plurality of operational activities, including: i) defining a common reference; ii) calculating distances from each defined coordinate to each other defined coordinate; and iii) filtering the calculated distances to filter out potential operational conflicts selected from the group consisting of one or more user defined distances, operational activities having no time conflicts, and distances greater than one or more user-defined buffer distances, box 506. The method further comprises identifying potential simultaneous operational activity conflicts using a tabular output format displayed on a user interface electronically connected to the computer, box 508.

Method embodiment 600, illustrated in FIG. 6, comprises storing operational scheduling data for a project having one or more project assets, the project assets able to perform a plurality of operational activities at defined state plane coordinates, in a scheduling database, box 602. Method embodiment 600 further comprises storing project-specific variables for the project in an external data source, box 604. Method 600 further comprises transforming, using software accessible by the computer, the state plane coordinates from a state plane coordinate system to Earth coordinates in an Earth coordinate system specified for a computer language able to express geographic annotation and visualization within one or more Internet-based, two-dimensional electronic maps and/or three-dimensional electronic Earth browsers displayed on a viewer electronically connected to the computer, thus forming a transformed scheduling database, box 606. Method 600 further comprises executing a database query of the transformed scheduling database and the external data source using the computer, returning all possible combinations of the plurality of operational activities, including: i) defining a common reference; ii) calculating distances from each Earth coordinate to all other Earth coordinates; and iii) filtering the calculated distances to filter out potential operational activity conflicts selected from the group consisting of one or more user defined distances, operational activities having no time conflicts, and distances greater than one or more user-defined buffer distances, box 608. Method 600 further comprises formatting unique icons for each operational activity and placing the icons on the electronic map and/or electronic Earth browser using the viewer and a user interface electronically connected to the computer, box 610. Method 600 further comprises specifying one or more Earth coordinates and/or geometries for each operational activity and placing these on the electronic map and/or electronic Earth browser using the viewer and user interface, box 612. The method further comprises specifying visual buffer area geometries for the project assets according to the state plane coordinates using the user interface, box 614, visually overlaying one or more of the visual buffer area geometries on one or more of the project assets and operational activities using the viewer and user interface, box 616, and visually identifying potential simultaneous operational activity conflicts by viewing the overlaid visual buffer areas using the viewer, box 618.

Method embodiment 700 comprises forming a first database of estimated dates of first production of a product or service from a plurality of project assets, and a second database of type curves for the project assets, box 702, and performing a Cartesian join of the first and second databases to obtain a Cartesian product, box 704. Method embodiment 700 further comprises summing results of the Cartesian product to obtain a third database of aggregate production rates at each project asset, box 706, and executing a database query of the third database at each project asset using a computer, returning aggregate production rates for each project asset for a user-defined time period, box 708. Method embodiment 700 further comprises comparing, using the computer, the aggregate production rates of each project asset to a project asset maximum rate for each project asset stored in the second database, box 710, and displaying, on a user interface electronically connected to the computer, a "percent loaded value" for one or more of the project assets per user-selected time period, box 712. Method 700 further comprises forecasting, using the computer, a "100 percent loaded" date for one or more of the project assets, box 714.

EXAMPLES

Method Example 1

Horizontal Field Developments (Tabular Output)

The first step is storing operational scheduling data and coordinates in the "scheduling database" [A] and storing project specific variables in an External Data Source [B].

Next, execute a database query that returns all possible combinations on the operational activities (Drill & Frac):
A) This calculates the distance FROM each Activity to EVERY activity
B) For a common reference, the left side (FROM activity) is the drill, the right side (TO activity) is the Frac (TH is Tophole or well Surface location. BH is well Bottom hole location)
    a. Drill TH—Frac TH
    b. Drill TH—Frac BH
    c. Drill BH—Frac BH
    d. Drill BH—Frac TH
C) Filter for potential operational conflicts by filtering out:
    a. Own well
    b. Pad operations
    c. Operations with no time conflict (>months apart)
    d. Distances >buffer
Data is in a tabular format.

Method Example 2

Horizontal Field Developments (KML Output)

Same as Example 1 (storing operational scheduling data and coordinates in the "scheduling database"[A] and storing project specific variables in an External Data Source [B])
Next, the following steps are performed:
A) Transforming coordinate data from State Plan Coordinate System (SPCS) to WGS84 (Coordinate system specified for KML)
B) Define unique icons for operations (Drill icon vs Frac icon)
C) Drill has 3 geometries
    a. TH point geometry (for placing the icon)
    b. BH point geometry (for defining the end of the well
    c. Line geometry for approximating the path of the wellbore
D) Frac has X geometries
    a. TH point geometry (for placing the icon)
    b. BH point geometry (for defining the end of the well)
    c. Line geometry for approximating the path of the wellbore
    d. Area geometry for showing buffer area
        i. Defined by buffer distance in project settings [A]
        ii. Area is 2x buffer (x to the left of the well, x to the right)
        iii. Area is shaded geometry
        iv. Multiple buffers can be overlayed on the well
            1. Scale or reference boundaries (used to show scale)
            2. "Watch windows" indicates operations inside the buffer at the same time may cause a conflict
            3. "Exclusion zone" indicates the area where operations will not be planned to occur within the distance at the same time.

Method Example 3

Facility Loading Calculator for Horizontal Field Developments

In general, determining a facility 100 percent loading date is accomplished by performing a Cartesian join of the estimated date of first production for a project asset with the type curve (flow rates by day) for each project asset, then comparing that to the max facility rate.
A) Cartesian product on Frac Finish+[Production Lag] & Type curve (specified as flow rate by day)
    a. Production Lag is the value to add to the Frac Finish to estimate a $1^{st}$ production date—Type curve day #1
B) Sum the rate at each facility (aggregate well production by date)
C) Query GROUP BY Facility D) Compare daily aggregate production rates to the Facility Max Rate specified in [A]"Facility Throughput"
E) Displays a % Loaded for each facility by day (rolls up to a max % for the month forecast).
F) Forecasts a Facility 100% loaded date.

Method Example 4

Generic SIMOPS Checker

Another method embodiment of the present disclosure would involve the following:
A) Create a matrix of "operational activity types" (such as, but not limited to, hot work, painting, crane and rigging operations, launching/recovering boats, hydrocarbon production trains in service/hydrocarbon on board, and the like).
B) With the matrix dimensioned (operational activity types across the column headers and first row), the "cells" are populated with the "minimum safe distance" or MSD. This would be the distance at which both activities could safely be performed at the same time. All activities would require a number (0 being "no separation required", while a distance greater than the area where work is being performed would indicate that the activities can never occur at the same time).
C) In conventional methods and systems, a SIMOPS matrix is color coded Green, Yellow, Red with foot notes. Green is "acceptable" or "OK" (activities may be performed at the same time with no separation considerations for safety). Yellow is OK under the following conditions (certain conditions must exist or precautions taken for work to be performed safely). Red is never allowed.
D) In accordance with the present disclosure, and what distinguishes these methods from previously known methods, is that this method employs the idea that there is a MSD, and each cell (instead of being color coded) is populated with the "buffer" distance that is required for the operational activities to be executed at the same time. With this data available to the computer, the schedule can automatically be checked for a multitude of SIMOPS operational activity types (based on an activity code assigned to the operational activity type in the scheduling database), and a MSD specified in a database such as described in Examples 1 and 2 that exists to assist a CPM scheduling software application to identify SIMOPS conflicts.
E) For a tabular output, such as prepared in accordance with Example 1, the operational activities are checked against the MSD to determine if a conflict exists, and conflicts are shown on a tabular report.
F) For a KML or map output, such as prepared in accordance with Example 2, the operational activities are drawn with custom buffers based on the MSD. A user may then visually determine which activities are in conflict.

Whereas certain methods, systems, and computer-readable media embodiments described herein may be trained to look for specific types of conflicts, this generic SIMOPS checker could be completely configured by a user to look for any number and type of user defined SIMOPS conflicts.

Method Example 5

Constraint Calculator

Figure 8A:
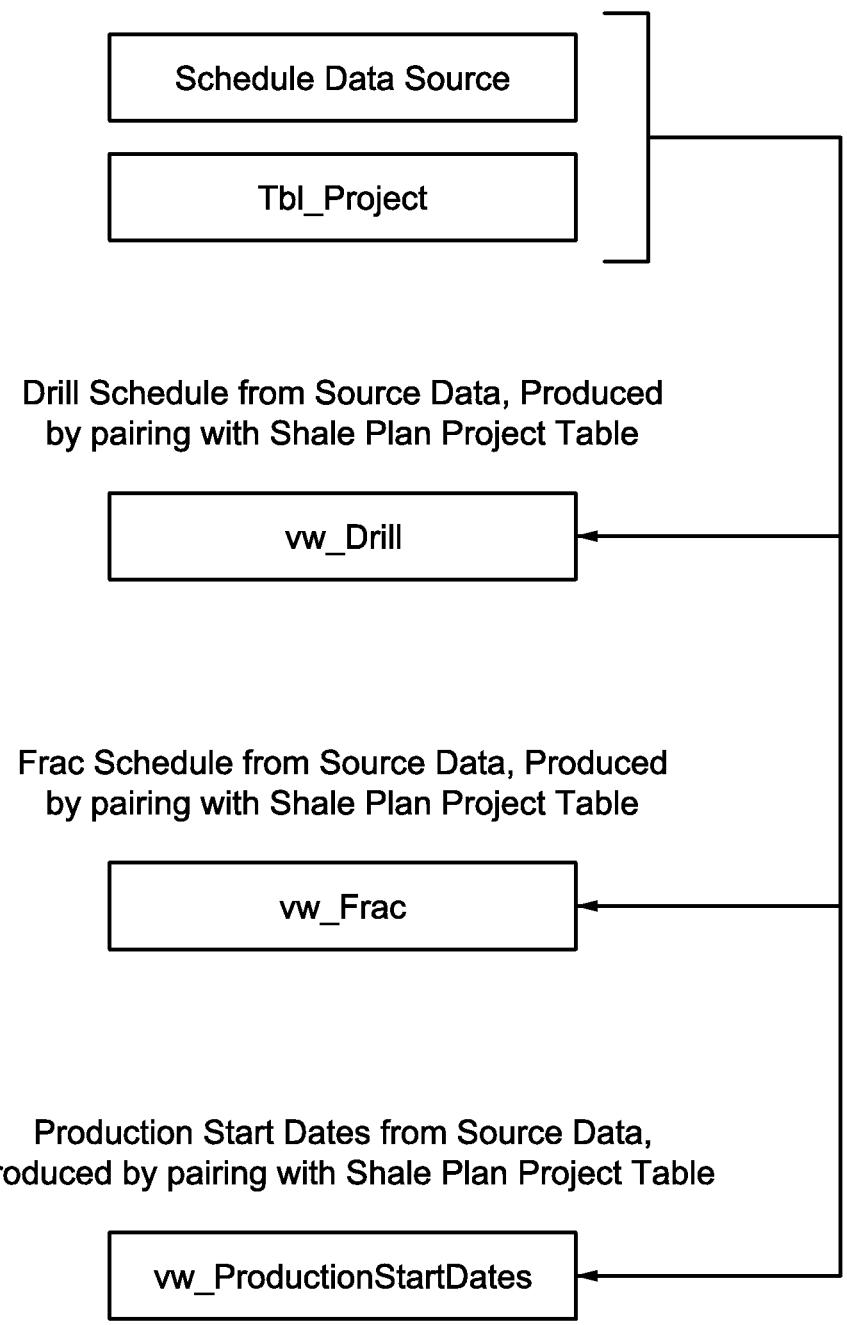
FIGS. 8A-C are flowcharts useful in describing certain aspects of the present disclosure.
Figure 8B:
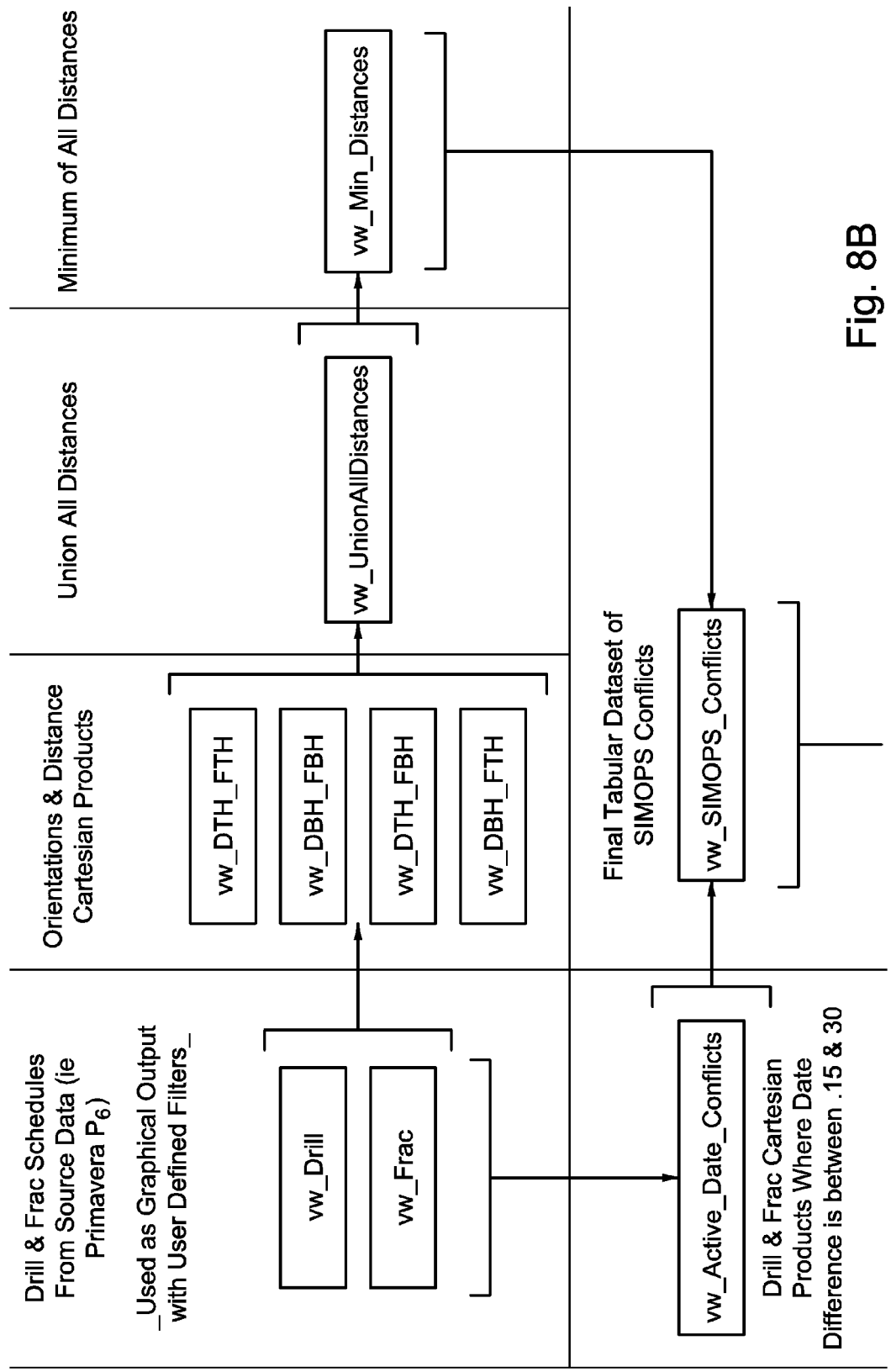
Figure 8C:
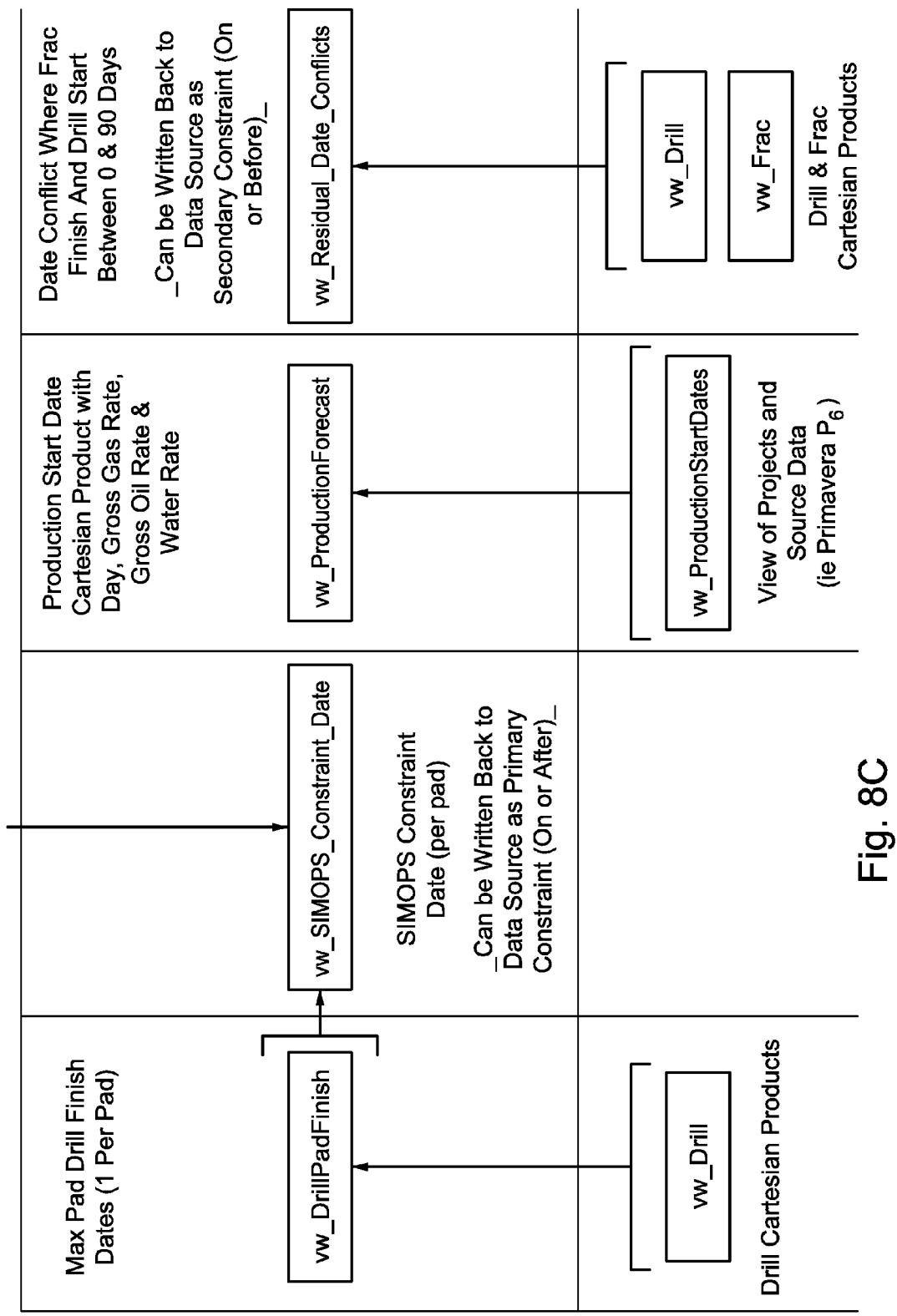

Start with the Drill and Frac filtered views. The flowcharts of FIGS. 8A-C are included for reference.

Four Cartesian products are executed to calculate the distances from the:

Drill Top Hole to Frac Top Hole;
Dill Bottom Hole to Frac Bottom Hole;
Drill Top Hole to Frac Bottom Hole; and
Drill Bottom Hole to Frac Top Hole.

The results of these queries are "unioned" into a larger dataset that represents all possible distance measurements from each well to all wells in the schedule. The previous 4× Cartesian product is reduced down to a 1× Cartesian product by running an aggregate query on the recordset to return the minimum of the 4 calculated distances from each well to all wells. (With this information, the user will know the minimum distance to compare to the buffer). Since these are horizontal wells, if the wells had top hole locations further apart than the buffer, but the wellbore paths approached each other, a conflict would exist but would not be found by only calculating the Drill Top Hole to Frac Top Hole measurement.

Once the wells that are less than or equal to the buffer distance are found, (potential SIMOPS conflicts based only on distance) they are compared to all operations that are close in time to each other (but may or may not be close in proximity). The resulting dataset (only the records that are on both lists) are actual SIMOPS conflicts because they were too close together at the same time. This is how the Tabular output for the methods of Examples 1 and 2 are calculated.

Method Example 6

Constraint Date Calculator

The goal is to find the latest "drill finish date" for each pad (one or many wells). This becomes the "Max Drill of Pad."

Where a frac conflicts with a drilling activity, the forecasted drill finish date for the entire pad is associated with the frac activity. This is the SIMOPS Constraint Date for the Frac.

If multiple drill activities are in conflict with a frac, the latest drill finish date becomes the SIMOPS Constraint date.

Wells may also be constrained for other reasons (water availability, materials, land issues, legal issues, or any other user defined reason). The latest of all of the constraints becomes the Frac On or After date (Frac Constraint date). This is the earliest date where no operational conflict will exist for that particular Frac.

In this embodiment, this completes the method as it has now provided the user with the "answer" instead of just alerting to "conflicts" or "potential conflict." The link back to the scheduling application is the Constraint Date as it is considered during the scheduling calculation. The computer-readable media of the present disclosure will write this value back to the scheduling database if the user selects the option to do so.

The right side of the diagrammatic view illustrated in FIG. 8C shows a "residual SIMOPS conflict." In other embodiments of the present disclosure, what is calculated is a "point in time SIMOPS conflict" or an active conflict. In other words, a user plans to start a frac before drilling finishes (Drill Finish to Frac Start). If the user delays the frac, the conflict can be avoided.

The second type of conflict is a "residual conflict", which is much less severe from the standpoint that money can usually fix the problem by adding an intermediate casing string to the well design, or by flowing a well back to relieve pressure. An example of a residual conflict may be when a drilling rig returns to a development area too soon after a frac has finished (Frac Finish to Drill Start).

Those having ordinary skill in this art will appreciate, after having read the present disclosure, that there are many possible variations of the methods, systems, and computer-readable media of the present disclosure, and will be able to devise alternatives and improvements to those described herein that are nevertheless considered to be within the claims of the present patent.

What is claimed is:

1. A method of enabling critical path method planning and scheduling software to perform resource constrained horizontal well drilling and hydraulic fracturing project planning and scheduling, the method comprising:
   a) storing horizontal well drilling and hydraulic fracturing operational scheduling data for a horizontal well drilling and hydraulic fracturing project, the project having one or more horizontal well drilling and hydraulic fracturing project assets, the horizontal well drilling and hydraulic fracturing project assets able to perform a plurality of horizontal well drilling and hydraulic fracturing operational activities at defined horizontal well drilling and hydraulic fracturing coordinates, in a horizontal well drilling and hydraulic fracturing scheduling database;
   b) storing project-specific variables for the horizontal well drilling and hydraulic fracturing project in an external data source;
   c) executing a database query of the horizontal well drilling and hydraulic fracturing scheduling database and the external data source using a computer, returning all possible combinations of the plurality of horizontal well drilling and hydraulic fracturing operational activities, including:
      i) defining a common reference;
      ii) calculating distances from each defined horizontal well drilling and hydraulic fracturing coordinate to each other horizontal well drilling and hydraulic fracturing defined coordinate;
      iii) filtering the calculated distances to filter out potential horizontal well drilling and hydraulic fracturing operational activity conflicts selected from the group consisting of one or more user defined distances, horizontal well drilling and hydraulic fracturing operational activities having no time conflicts, and distances greater than one or more user-defined buffer distances between horizontal well drilling and hydraulic fracturing assets;
   d) identifying potential simultaneous horizontal well drilling and hydraulic fracturing operational activity conflicts displayed on a user interface in tabular output format, the user interface electronically connected to the computer;
   e) associating the hydraulic fracturing operational activity with a latest horizontal well drilling finish date identified from step (d) for each horizontal well pad of the project, and assigning the latest horizontal well drilling finish date as "SIMOPS Constraint Date" for the hydraulic fracturing;
   f) determining from among the project-specific variables and the SIMOPS Constraint Date an activity occurring latest in time, and assigning this as "Frac Constraint Date";
   g) performing critical path method planning and scheduling of the horizontal well drilling and hydraulic fracturing project using the Frac Constraint Date and critical path method planning and scheduling software running on the computer, thus enabling the critical path method planning and scheduling software to perform resource constrained critical path method planning and scheduling of the horizontal well drilling and hydraulic fracturing project.

2. The method of claim 1 wherein the defining of a common reference comprises creating a table of horizontal well drilling coordinates and hydraulic fracturing coordinates, wherein the horizontal well drilling coordinates are on a left side of the table and the hydraulic fracturing coordinates are on a right side of the table.

3. The method of claim 1 wherein the identifying of potential simultaneous horizontal well drilling and hydraulic fracturing operational activity conflicts displayed on a user interface in tabular output format, the user interface electronically connected to the computer comprises wirelessly connecting between the user interface and the computer.

4. The method of claim 1 wherein the filtering the calculated distances to filter out potential horizontal well drilling and hydraulic fracturing operational conflicts comprises filtering one or more user defined distances from an operator's own well and pad operations.

5. The method of claim 1 wherein the computer is selected from the group consisting of a hand-held computer, a laptop computer, a desktop computer, and a tablet computer.

6. The method of claim 1 wherein the one or more horizontal well drilling and hydraulic fracturing project assets are selected from the group consisting of one or more horizontal well drilling rigs, one or more slurry blenders, one or more high-pressure, high-volume fracturing pumps, one or more monitoring units, one or more fracturing tanks, one or more units for storage and handling of proppant, high-pressure treating iron, one or more chemical additive units to accurately monitor chemical addition, low-pressure flexible hoses, and gauges and meters for flow rate, fluid density, and treating pressure.

7. A computer-readable medium encoded with non-transitory processing instructions for implementing a method of enabling critical path method planning and scheduling software to perform resource constrained horizontal well drilling and hydraulic fracturing project planning and scheduling, the method comprising:
   a) storing horizontal well drilling and hydraulic fracturing operational scheduling data for the horizontal well drilling and hydraulic fracturing project having one or more horizontal well drilling and hydraulic fracturing project assets, the horizontal well drilling and hydraulic fracturing project assets able to perform a plurality of horizontal well drilling and hydraulic fracturing operational activities at defined coordinates, in a horizontal well drilling and hydraulic fracturing scheduling database;
   b) storing project-specific variables for the horizontal well drilling and hydraulic fracturing project in an external data source;
   c) executing a database query of the horizontal well drilling and hydraulic fracturing scheduling database and the external data source using a computer, returning all possible combinations of the plurality of horizontal well drilling and hydraulic fracturing operational activities, including:
      i) defining a common reference;
      ii) calculating distances from each defined horizontal well drilling and hydraulic fracturing coordinate to each other defined horizontal well drilling and hydraulic fracturing coordinate;

iii) filtering the calculated distances to filter out potential horizontal well drilling and hydraulic fracturing operational activity conflicts selected from the group consisting of one or more user defined distances, horizontal well drilling and hydraulic fracturing operational activities having no time conflicts, and distances greater than one or more user-defined buffer distances;

d) identifying potential simultaneous horizontal well drilling and hydraulic fracturing operational activity conflicts displayed on a user interface in tabular output format, the user interface electronically connected to the computer e) associating the hydraulic fracturing operational activity with a latest horizontal well drilling finish date identified from step (d) for each horizontal well pad of the project, and assigning the latest horizontal well drilling finish date as "SIMOPS Constraint Date" for the hydraulic fracturing;

f) determining from among the project-specific variables and the SIMOPS Constraint Date an activity occurring latest in time, and assigning this as "Frac Constraint Date";

g) performing critical path method planning and scheduling of the horizontal well drilling and hydraulic fracturing project using the Frac Constraint Date and critical path method planning and scheduling software running on the computer, thus enabling the critical path method planning and scheduling software to perform resource constrained critical path method planning and scheduling of the horizontal well drilling and hydraulic fracturing project.

8. A method of enabling critical path method planning and scheduling software to perform resource constrained project planning and scheduling, the method comprising:
   a) storing operational scheduling data for a project, the project having one or more project assets, the project assets able to perform a plurality of operational activities at defined coordinates, in a scheduling database;
   b) storing project-specific variables for the project in an external data source;
   c) executing a database query of the scheduling database and the external data source using a computer, returning all possible combinations of the plurality of operational activities, including:
      i) defining a common reference;
      ii) calculating distances from each defined coordinate to each other defined coordinate;
      iii) filtering the calculated distances to filter out potential operational activity conflicts selected from the group consisting of one or more user defined distances, operational activities having no time conflicts, and distances greater than one or more user-defined buffer distances between the project assets;
   d) identifying potential simultaneous operational activity conflicts displayed on a user interface in tabular output format, the user interface electronically connected to the computer;
   e) associating the operational activity with a latest finish date identified from step (d), and assigning the latest finish date as "SIMOPS Constraint Date" for the project;
   f) determining from among the project-specific variables and the SIMOPS Constraint Date an activity occurring latest in time, and assigning this as "Project Constraint Date";
   g) performing critical path method planning and scheduling of the project using the Project Constraint Date and critical path method planning and scheduling software running on the computer, thus enabling the critical path method planning and scheduling software to perform resource constrained critical path method planning and scheduling of the project.

9. A computer-readable medium encoded with non-transitory processing instructions for implementing a method of enabling critical path method planning and scheduling software to perform resource constrained planning and scheduling, the method comprising:
   a) storing operational scheduling data for a project, the project having one or more project assets, the project assets able to perform a plurality of operational activities at defined coordinates, in a scheduling database;
   b) storing project-specific variables for the project in an external data source;
   c) executing a database query of the scheduling database and the external data source using a computer, returning all possible combinations of the plurality of operational activities, including:
      i) defining a common reference;
      ii) calculating distances from each defined coordinate to each other defined coordinate;
      iii) filtering the calculated distances to filter out potential operational activity conflicts selected from the group consisting of one or more user defined distances, operational activities having no time conflicts, and distances greater than one or more user-defined buffer distances between the project assets;
   d) identifying potential simultaneous operational activity conflicts displayed on a user interface in tabular output format, the user interface electronically connected to the computer;
   e) associating the operational activity with a latest finish date identified from step (d), and assigning the latest finish date as "SIMOPS Constraint Date" for the project;
   f) determining from among the project-specific variables and the SIMOPS Constraint Date an activity occurring latest in time, and assigning this as "Project Constraint Date";
   g) performing critical path method planning and scheduling of the project using the Project Constraint Date and critical path method planning and scheduling software running on the computer, thus enabling the critical path method planning and scheduling software to perform resource constrained critical path method planning and scheduling of the project.

* * * * *